(12) United States Patent  (10) Patent No.: US 8,867,054 B2
Schleede  (45) Date of Patent: Oct. 21, 2014

(54) FILE OF MULTIPLE PRINT DRIVER OUTPUT FILES FOR PULL-PRINTING ON MULTIPLE DEVICES

(75) Inventor: Kenneth B. Schleede, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 157 days.

(21) Appl. No.: 13/555,307

(22) Filed: Jul. 23, 2012

(65) Prior Publication Data

US 2014/0022573 A1    Jan. 23, 2014

(51) Int. Cl.
*G06F 3/12*      (2006.01)
*G06K 15/00*    (2006.01)
*G06K 15/10*    (2006.01)

(52) U.S. Cl.
CPC ............ *G06F 3/1204* (2013.01); *G06F 3/1205* (2013.01)
USPC .......... 358/1.13; 358/1.15; 358/1.14; 358/1.8

(58) Field of Classification Search
None
See application file for complete search history.

(56) References Cited

U.S. PATENT DOCUMENTS

| | | | |
|---|---|---|---|
| 5,715,379 A | | 2/1998 | Pavlovic et al. |
| 6,032,004 A | | 2/2000 | Mirabella, Jr. et al. |
| 6,672,212 B1 * | 1/2004 | Ferlitsch ...................... 101/484 |
| 6,690,478 B1 * | 2/2004 | McIntyre ..................... 358/1.13 |
| 6,801,330 B1 * | 10/2004 | Klosterman et al. ......... 358/1.13 |
| 6,833,925 B1 | 12/2004 | Igoe et al. |
| 6,943,905 B2 | 9/2005 | Ferlitsch |
| 7,161,711 B2 | 1/2007 | Mori et al. |
| 7,532,357 B2 | 5/2009 | Robinson et al. |
| 7,564,572 B2 | 7/2009 | Nishikawa et al. |
| 7,728,999 B2 * | 6/2010 | White et al. ................. 358/1.15 |
| 7,908,609 B2 * | 3/2011 | Mitsui ........................... 719/321 |
| 7,990,558 B2 | 8/2011 | Nakata |
| 8,009,309 B2 * | 8/2011 | Bystrom et al. ............. 358/1.15 |
| 8,078,005 B2 | 12/2011 | Takashima |
| 8,164,766 B2 * | 4/2012 | van de Capelle et al. .... 358/1.13 |
| 8,248,632 B2 * | 8/2012 | Farrell et al. ................ 358/1.14 |
| 2008/0079976 A1 * | 4/2008 | van de Capelle et al. .... 358/1.13 |
| 2008/0222522 A1 * | 9/2008 | Morales ........................ 715/276 |
| 2009/0180147 A1 * | 7/2009 | Ferlitsch ...................... 358/1.18 |
| 2010/0271657 A1 * | 10/2010 | Morales ...................... 358/1.15 |
| 2011/0228340 A1 * | 9/2011 | Farrell et al. ................. 358/1.18 |
| 2011/0286036 A1 * | 11/2011 | Kobayashi ................... 358/1.15 |
| 2013/0169980 A1 * | 7/2013 | Johnson et al. ................ 358/1.8 |

* cited by examiner

*Primary Examiner* — Satwant Singh
(74) *Attorney, Agent, or Firm* — Gibb & Riley, LLC

(57) ABSTRACT

Methods and systems receive a request to print an item into a computerized device, and automatically create print driver output files. Such methods and systems also automatically combine the print driver output files into a multiple page description language (multi-PDL) file for the item and store the multi-PDL file in a non-volatile computer storage medium. This multi-PDL file allows the decision on which of the page description languages or other formats are needed to be delayed to a time when it is clear what device, method or system will be using the output files. Subsequently, the methods and systems receive an instruction to print the item into a printing device. In response, such methods and systems automatically retrieve the multi-PDL file from the non-volatile computer storage medium using the printing device, and automatically select one of the driver output files from the print driver output files in the multi-PDL file.

20 Claims, 4 Drawing Sheets

FILE OF MULTIPLE PRINT DRIVER OUTPUT FILES FOR PULL-PRINTING ON MULTIPLE DEVICES

BACKGROUND

Embodiments herein generally relate to printing systems and printing methods and more particularly to systems that allow users to pull items from a central holding area, and potentially print items on many different types of printers.

Print drivers use many unique commands for each different type of printer model, and commands for one type of printer model may not be understood by other printing devices. In an environment where print-ready jobs can be routed to different printer models or different configurations than the print-ready jobs were created for, the results may be unpredictable and are usually unsatisfactory. For example, the wrong tray may be used, the colors may not be accurate, many sheets of code may be printed instead of the document, etc.

Having print-ready files for one model or configuration sent to a different destination is very prevalent because of server solutions that allow a user to "pull" their print job to different devices. A pull-print situation occurs when the user submits a job that it is held somewhere instead of being sent to a user-pre-designated device. Then the user goes to any device in the organization that is part of pull-printing and calls the job to that device to be printed. This workflow is very useful in an organization where people travel to meetings often. If the print job was created with the driver that matches the printer model that is performing the printing, the print job usually prints well; however, different printer models or different configurations may produce unpredictable and unsatisfactory results.

SUMMARY

Exemplary methods herein receive a request to print an item into a computerized device, and automatically create print driver output files. When creating the print driver output files the methods herein create a print driver output file for each different type of printing device configured to retrieve print jobs from the computer storage medium. Each of the print driver output files comprises different instructions for printing the item.

The methods herein also automatically combine the print driver output files into a multiple page description language (multi-PDL) file for the item using the computerized device, and automatically store the multi-PDL file in a computer storage medium that is operatively (directly or indirectly) connected to the computerized device. The multi-PDL file can include headers and footers separating each of the print driver output files. This multi-PDL file allows the decision on which of the page description languages or other formats are needed to be delayed to a time when it is clear what device, method or system will be using the output files.

Subsequently, the methods herein receive an instruction to print the item into a printing device operatively connected to the computer storage medium. In response, such methods automatically retrieve the multi-PDL file from the computer storage medium using the printing device, and automatically select one of the driver output files from the print driver output files in the multi-PDL file using the printing device. Next, such methods automatically print the item using the selected driver output file using the printing device, and the methods remove the multi-PDL file from the computer storage medium after the printing device prints the item.

Other exemplary methods herein receive a request to print an item into a computerized device, and automatically invoke a printing framework operating on the computerized device in response to the request to print the item. The printing framework automatically creates print driver output files. When creating the print driver output files the methods herein create a print driver output file for each different type of printing device configured to retrieve print jobs from the computer storage medium. Each of the print driver output files comprises different instructions for printing the item.

The methods herein also automatically combine the print driver output files into a multiple page description language (multi-PDL) file for the item using the computerized device, and automatically store the multi-PDL file in a computer storage medium that is operatively connected to the computerized device. The multi-PDL file comprises headers and footers separating each of the print driver output files.

Subsequently, the methods herein receive an instruction to print the item into a printing device operatively connected to the computer storage medium. In response, such methods automatically retrieve the multi-PDL file from the computer storage medium using the printing device, and automatically select one of the driver output files from the print driver output files in the multi-PDL file using the printing device. Next, such methods automatically print the item using the selected driver output file using the printing device, and the methods remove the multi-PDL file from the computer storage medium after the printing device prints the item.

Exemplary systems herein include computerized devices, at least one volatile (such as random access memory (RAM)) or non-volatile computer storage medium (NVM) operatively connected to the computerized devices, printing devices operatively connected to the computer storage medium, etc. Thus, for example, a computer might put together a multi-PDL file and send the multi-PDL file to volatile RAM (or a non-volatile, non-transitory storage medium) then transmit the multi-PDL file to a server that holds it in volatile or non-volatile memory, and then the multi-PDL file could go to a printer and be held in volatile or non-volatile memory. One of the computerized devices receives a request to print an item, and automatically creates print driver output files in response to the request to print the item. That computerized device automatically combines the print driver output files into a multiple page description language (multi-PDL) file for the item. The computerized device automatically stores the multi-PDL file in the non-volatile computer storage medium.

One of the devices receives an instruction to print the item and that device automatically retrieves the multi-PDL file from the computer storage medium in response. The device automatically selects a driver output file from the print driver output files in the multi-PDL file. Thus, for example, a computer server could hold the multi-PDL file, an originating PC might hold the multi-PDL file, or a printing device can hold the multi-PDL file before forwarding the multi-PDL file to another printing device, etc. The printing device also automatically prints the item using the selected driver output file.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
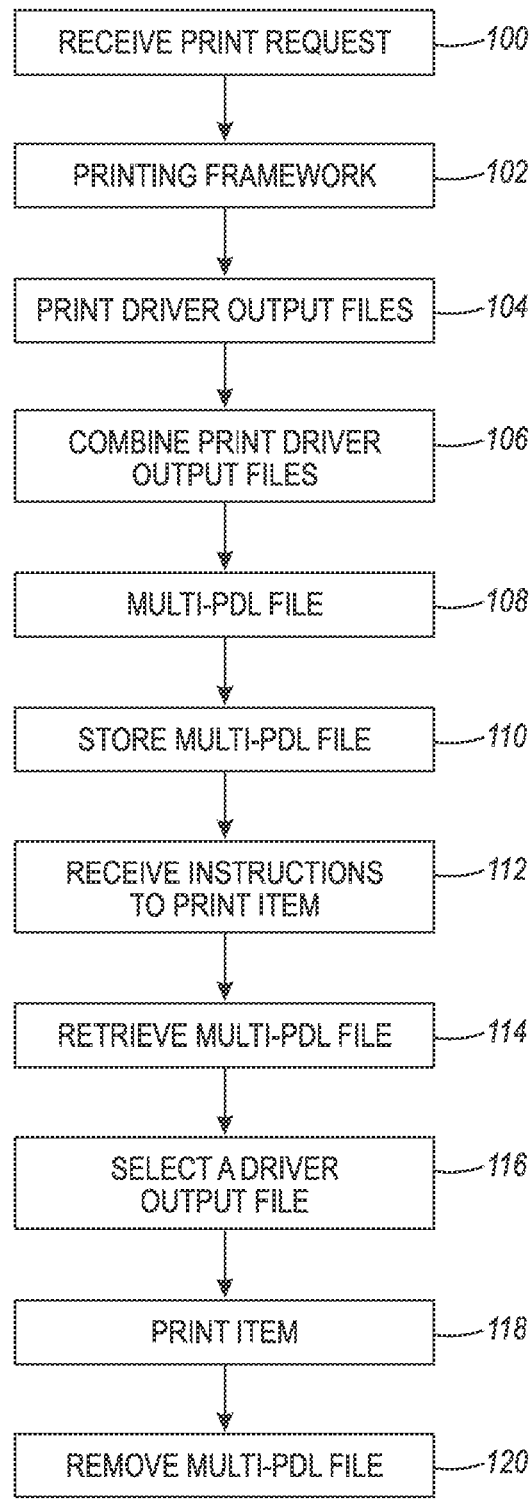
FIG. 1 is a flow diagram illustrating various embodiments herein.

As mentioned above, in an environment where print-ready jobs can be routed to different printer models or different configurations than the print-ready jobs were created for, the results may be unpredictable and are usually unsatisfactory. Therefore, the systems and methods herein combine output from multiple print drivers in a single file so that a user can seamlessly and automatically print successfully in a pull-print or similar environment.

The printing "framework" system herein uses a set of print drivers and a fleet of devices and takes a user's document, creates separate driver output for all of the possible printer models/options, combines the separate driver output files into a "multi-PDL" file, and sends the multi-PDL file to a holding area. Then each device that pulls a print job will extract the commands that it uniquely needs from the appropriate print driver output file in the multi-PDL file, and disregard the rest.

The printing framework accepts the users formatting choices and then engages all the print drivers that are needed to produce the output. The printing framework bundles the output from each of driver into one multi-PDL file. The printing framework can use more than one file in conjunction with a system to handle all the files in a job as a bundle or "logical job".

The printing framework can send along in the "Multi-PDL" file more than just print driver output and header information, such as: a PDF or XPS or similar rendering of the document for archival or auditing purposes. Alternatively, a copy of the source file itself could be included in the multi-PDL file. These other formats could allow the job to be recreated at a later time if needed.

An element of the printing framework herein is that ability to compress and/or encrypt the multiple files making up the multi-PDL file, either in total or individually (in pieces) in such a way that the systems herein can manage the individual pieces or the whole file. The client computer, the holding area, intermediate servers and the end consuming device can extract only the pieces they need from the multi-PDL and pass them on or output them. They do not need to understand how to decrypt or output the whole file, just the headers, and control parts and the piece meant for them. Thus, the server, printer, computer, etc., may send only the section of the file that was needed by the pulling device, not the whole multi-PDL file. Thus, just the part of the multi-PDL file that the device needed might be extracted and sent.

The systems presented herein include all the same commands that are needed for outputting to any of the devices that might be chosen by the user in the multi-PDL file. Such systems then manage all the PDL pieces as one logical job. For example, a customer may have a number of different print devices that are configured to pull print jobs from a central place. The user then submits a print job through the "printing framework". The framework asks the basic questions about a job, such as the number of copies, stapling, etc., and appears to the customer as a print driver would appear on the graphic user interface. The printing framework uses existing print drivers to create print ready output for more than one printer. The determination of what constitutes a unique set of PDL commands for a device is decided not just by model number, but also by device capabilities like PostScript, fax or stapling.

The systems presented herein capture the output of each of those drivers, and add the appropriate headers separators and footers between the jobs to make the multi-PDL file. Optionally each of the print ready outputs from the different drivers may be compressed and/or encrypted.

The printing framework then puts that output in the print queue object as a driver would output a job. The holding area is typically a server but could be a particular computerized printing device or could even be the user's computer. The user walks to a convenient printing device, uses the system to contact the server holding area and pulls one of the jobs that are waiting. The printing device that they have selected to use to output the job decompresses and/or decrypts the job, and searches the multi-PDL file to find the appropriate print-ready output that is tagged for that device. The printing device extracts such print-ready output and prints it. Optionally, the device notifies the holding area management system that the job has printed successfully.

The systems and methods herein do not require the user to understand the differences between the models or to name multiple different print driver output files so they can identify which one is which. The printing framework adds in control information to manage the job and to optionally compress the jobs so they are safer and smaller. The printing device itself takes care of extracting which print-ready file that is needed, instead of the user having to select one. The systems and methods herein use separate and independent drivers to create accurate print ready files for the entire job and send them on to be extracted at a later point of need.

The printing framework and system herein send data in multiple formats, and this lends to several extensions. Besides encryption and compression the systems and methods herein can also send different versions of the job for different purposes such as archiving or rendering at a later time. The systems and methods herein can send the source file on with the PDL files and use that to re-create a job. The systems and methods herein can also be used to "proof" a job on the local printing device and send a copy in some form to a production printer that can print that same job at higher quality or at a faster speed, or a cheaper price. The systems and methods herein can have jobs be automatically re-routed to another device if there is an overload condition.

System and methods here allow users to print their documents without having to worry about what printer model will ultimately be used to output the document. Further, such system allow print drivers, devices and queue/servers to send or receive unique commands for multiple, different devices or interpreters in one logical transmission so that user does not need to choose which device will print the job. Additionally, the methods and systems herein allow users to send print jobs to multiple, dissimilar printers or storage devices using print drivers, applications, devices and queue/servers to send or receive unique commands for multiple, different devices or interpreters in one logical transmission so that user does not need to choose which model or device will print or handle the job.

FIG. 1 is flowchart illustrating an exemplary method herein. In item 100, exemplary methods herein receive a request to print an item into a computerized device. In item 102, such methods automatically invoke a printing framework operating on the computerized device in response to the request to print the item. The printing framework presents a standard print driver interface to the user, obtaining all necessary printing information, including print quality, number of copies, duplexing information, paper size, etc.

The printing framework 102 automatically creates multiple print driver output files, as shown by item 104. The printing framework 102 can create the print driver output files on its own, or can invoke separate print drivers to create such print driver output files automatically, and without requiring any additional action or input from the user. When creating the print driver output files in item 104, the methods herein create a print driver output file for each different type of printing device configured to retrieve print jobs from the non-volatile computer storage medium. Each of the print driver output files 104 contains different instructions for printing the item that correspond to the standards of the different printing devices which might print the print job.

In item 106, the methods herein also automatically combine the print driver output files into a multiple page description language (multi-PDL) file 108 for the item using the computerized device. The multi-PDL file 108 can use headers and footers to separate each of the print driver output files. In item 110, the methods herein automatically store the multi-PDL file in a non-volatile computer storage medium that is operatively connected to the computerized device. This multi-PDL file allows the decision on which of the page description languages or other formats are needed to be delayed to a time when it is clear what device, method or system will be using the output files. For example, a computer might put together a multi-PDL file and send the multi-PDL file to volatile RAM (or a non-volatile, non-transitory storage medium) then transmit the multi-PDL file to a server that holds it in volatile or non-volatile memory, and then the multi-PDL file could go to a printer and be held in volatile or non-volatile memory.

Subsequently, the methods herein receive an instruction to print the item from a user interacting with a printing device that is operatively connected to the computer storage medium in item 112. In response, such methods automatically retrieve the multi-PDL file from the computer storage medium in item 114, and automatically select one of the driver output files from the print driver output files in the multi-PDL file in item 116. Thus, for example, a computer server could hold the multi-PDL file, an originating PC might hold the multi-PDL file, or a printing device can hold the multi-PDL file before forwarding the multi-PDL file to another printing device, etc. Further, the server, printer, computer, etc., may send only the section of the file that was needed by the pulling device, not the whole multi-PDL file. Thus, just the part of the multi-PDL file that the device needed might be extracted and sent.

For example, computerized instructions (in the form of software, for example) in the printing device operated by the user can recognize the multi-PDL file as one containing many different driver output files from header information in the multi-PDL file, or from a filename or filename extension of the multi-PDL. Once a device has recognized the multi-PDL file, such computerized instructions cause that device to search the headers in the multi-PDL file to find a matching print driver output file that corresponds to the printer that the user has selected for printing. Then, that device only needs to extract its corresponding driver output file from the multi-PDL file (and that printer can ignore the remainder of the multi-PDL file). Alternatively, other computerized devices (such as a print server) could extract the appropriate print driver output file for a given printer from the stored multi-PLD file and supply such a print driver output file to the selected printer.

Next, such methods automatically print the item using the selected driver output file using the printing device in item 118, and the methods can remove the multi-PDL file from the computer storage medium after the printing device prints the item in item 120.

Figure 2:
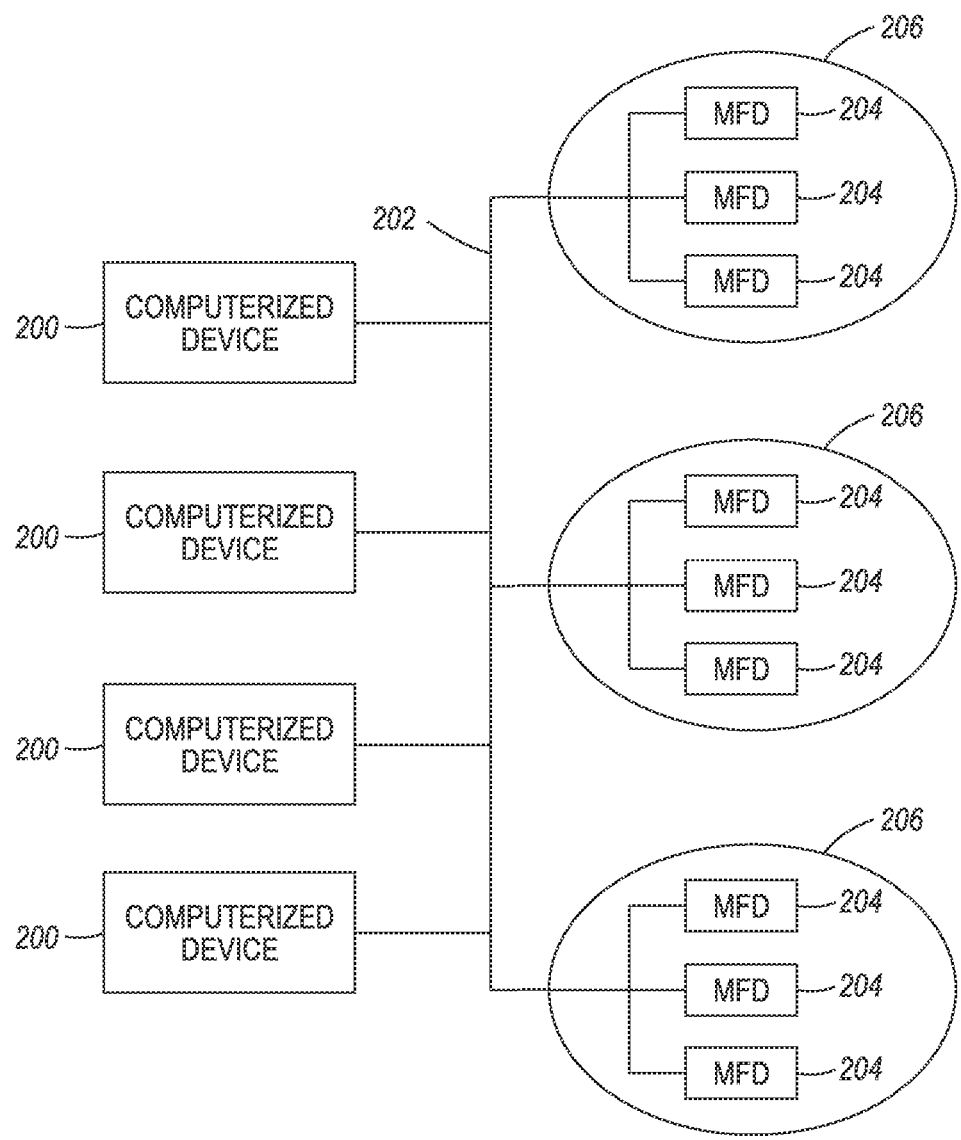
FIG. 2 is a schematic diagram of a system according to embodiments herein.

As shown in FIG. 2, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
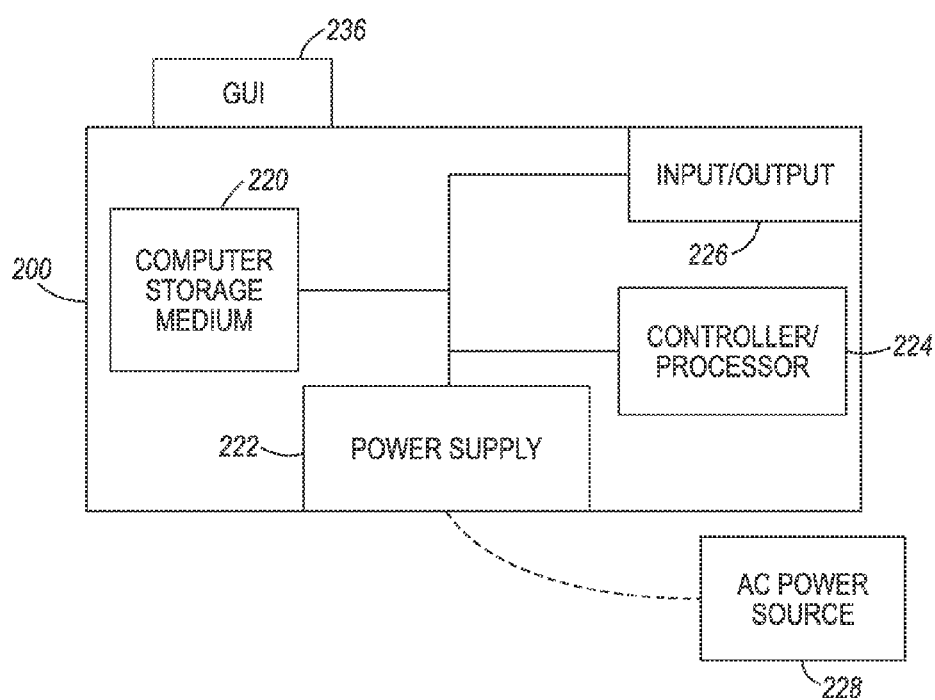
FIG. 3 is a schematic diagram of a device according to embodiments herein.

FIG. 3 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory, non-volatile computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 4:
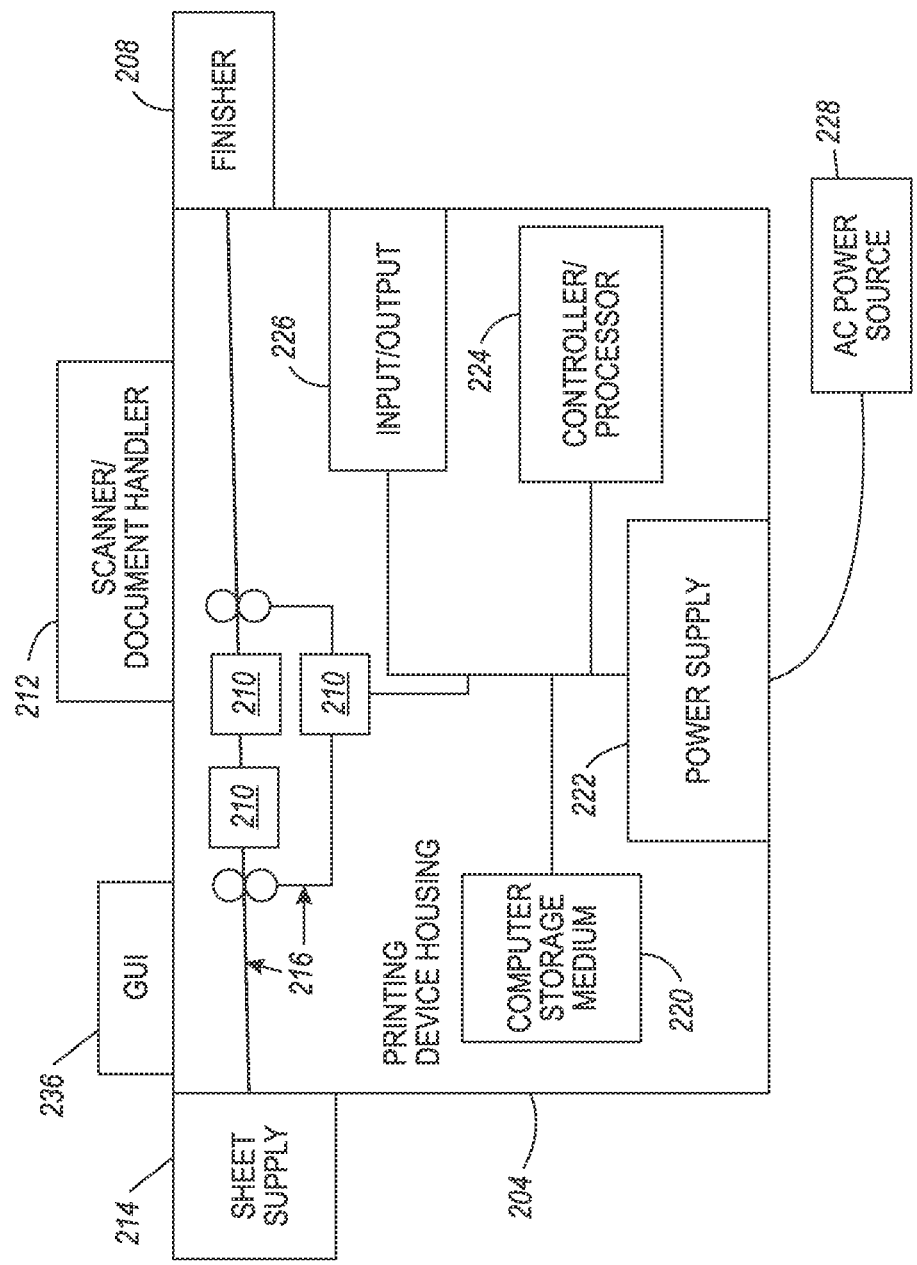
FIG. 4 is a schematic diagram of a device according to embodiments herein.

FIG. 4 illustrates a computerized device that is a printing device 204, which can be used with embodiments herein and can comprise, for example, a printer, copier, multi-function machine, multi-function device (MDF), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

As would be understood by those ordinarily skilled in the art, the devices shown in FIGS. 3 and 4 are only examples and the embodiments herein are equally applicable to other types of devices that may include fewer components or more components. For example, while a limited number of printing engines and paper paths are illustrated in FIG. 4, those ordinarily skilled in the art would understand that many more paper paths and additional printing engines could be included within any printing device used with embodiments herein.

In such a system, one of the devices 200/204 receives a request to print an item, and automatically creates print driver output files 104 in response to the request to print the item. That computerized device 200/204 automatically combines the print driver output files 104 into a multiple page description language (multi-PDL) file 108 for the item. The computerized device 200/204 automatically stores the multi-PDL file 108 in the computer storage medium 220.

One of the computerized device 200/204 receives an instruction to print the item and that printing device 204 automatically retrieves the multi-PDL file 108 from the computer storage medium 220 in response. The computerized device 200/204 automatically selects a driver output file from the print driver output files 104 in the multi-PDL file 108. The printing device 204 also automatically prints the item using the selected driver output file.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
    receiving a request to submit an item for printing into a computerized device;
    automatically creating print driver output files in response to receiving said request to submit said item for printing, using said computerized device;
    automatically combining said print driver output files into a multiple page description language (multi-PDL) file for said item using said computerized device;
    automatically storing said multi-PDL file in a non-transitory computer storage medium that is operatively connected to said computerized device;
    receiving an instruction to print said item;
    automatically retrieving said multi-PDL file from said non-transitory computer storage medium;
    automatically selecting a selected driver output file from said print driver output files in said multi-PDL file; and
    automatically printing said item using said selected driver output file using a printing device operatively connected to said non-transitory computer storage medium.

2. The method according to claim 1, said creating of said print driver output files comprising creating a print driver output file for each different type of printing device configured to retrieve print jobs from said non-transitory computer storage medium.

3. The method according to claim 1, each of said print driver output files comprising different instructions for printing said item.

4. The method according to claim 1, said multi-PDL file comprising headers and footers separating each of said print driver output files.

5. The method according to claim 1, further comprising removing said multi-PDL file from said non-transitory computer storage medium after said printing device prints said item.

6. A method comprising:
    receiving a request to submit an item for printing into a computerized device;
    automatically invoking a printing framework operating on said computerized device in response to said request to submit said item for printing, said printing framework automatically creating print driver output files;
    automatically combining said print driver output files into a multiple page description language (multi-PDL) file for said item using said computerized device;
    automatically storing said multi-PDL file in a non-transitory computer storage medium that is operatively connected to said computerized device;
    receiving an instruction to print said item;
    automatically retrieving said multi-PDL file from said non-transitory computer storage medium;
    automatically selecting a selected driver output file from said print driver output files in said multi-PDL file; and
    automatically printing said item using said selected driver output file using a printing device operatively connected to said non-transitory computer storage medium.

7. The method according to claim 6, said creating of said print driver output files comprising creating a print driver output file for each different type of printing device configured to retrieve print jobs from said non-transitory computer storage medium.

8. The method according to claim 6, each of said print driver output files comprising different instructions for printing said item.

9. The method according to claim 6, said multi-PDL file comprising headers and footers separating each of said print driver output files.

10. The method according to claim 6, further comprising removing said multi-PDL file from said non-transitory computer storage medium after said printing device prints said item.

11. A system comprising:
computerized devices;
at least one non-transitory computer storage medium operatively connected to said computerized devices; and
printing devices operatively connected to said non-transitory computer storage medium,
a computerized device of said computerized devices receiving a request to submit an item for printing;
said computerized device automatically creating print driver output files in response to said request to submit said item for printing;
said computerized device automatically combining said print driver output files into a multiple page description language (multi-PDL) file for said item;
said computerized device automatically storing said multi-PDL file in said non-transitory computer storage medium;
a printing device of said printing devices receiving an instruction to print said item;
said printing device automatically retrieving said multi-PDL file from said non-transitory computer storage medium;
said printing device automatically selecting a selected driver output file from said print driver output files in said multi-PDL file; and
said printing device automatically printing said item using said selected driver output file.

12. The system according to claim 11, said computerized device creating said print driver output files by creating a print driver output file for each different type of printing device configured to retrieve print jobs from said non-transitory computer storage medium.

13. The system according to claim 11, each of said print driver output files comprising different instructions for printing said item.

14. The system according to claim 11, said multi-PDL file comprising headers and footers separating each of said print driver output files.

15. The system according to claim 11, said computerized device removing said multi-PDL file from said non-transitory computer storage medium after said printing device prints said item.

16. A non-transitory computer-readable storage medium storing instructions executable by a computerized device, said instructions causing said computerized device to perform a method comprising:
receiving a request to submit an item for printing into said computerized device;
automatically creating print driver output files in response to receiving said request to submit said item for printing, using said computerized device;
automatically combining said print driver output files into a multiple page description language (multi-PDL) file for said item using said computerized device;
automatically storing said multi-PDL file in a non-transitory computer storage medium that is operatively connected to said computerized device;
receiving an instruction to print said item into a printing device operatively connected to said non-transitory computer storage medium;
automatically retrieving said multi-PDL file from said non-transitory computer storage medium using said printing device;
automatically selecting a selected driver output file from said print driver output files in said multi-PDL file using said printing device; and
automatically printing said item using said selected driver output file using said printing device.

17. The non-transitory computer-readable storage medium according to claim 16, said creating of said print driver output files comprising creating a print driver output file for each different type of printing device configured to retrieve print jobs from said non-transitory computer storage medium.

18. The non-transitory computer-readable storage medium according to claim 16, each of said print driver output files comprising different instructions for printing said item.

19. The non-transitory computer-readable storage medium according to claim 16, said multi-PDL file comprising headers and footers separating each of said print driver output files.

20. The non-transitory computer-readable storage medium according to claim 16, said method further comprising removing said multi-PDL file from said non-transitory computer storage medium after said printing device prints said item.

* * * * *